US012572556B2

(12) United States Patent
Liu et al.

(10) Patent No.: US 12,572,556 B2
(45) Date of Patent: Mar. 10, 2026

(54) DATA QUERY REQUEST PROCESSING METHOD, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Jianpeng Liu, Shenzhen (CN); Jie Jiang, Shenzhen (CN); Xiaosen Li, Shenzhen (CN); Pin Xiao, Shenzhen (CN); Yong Cheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/637,624

(22) Filed: Apr. 17, 2024

(65) Prior Publication Data

US 2024/0265022 A1 Aug. 8, 2024

Related U.S. Application Data

(63) Continuation of application No. PCT/CN2023/095835, filed on May 23, 2023.

(30) Foreign Application Priority Data

Jul. 27, 2022 (CN) .......................... 202210891780.8

(51) Int. Cl.
*G06F 16/2458* (2019.01)
*G06F 16/901* (2019.01)

(52) U.S. Cl.
CPC ...... *G06F 16/2471* (2019.01); *G06F 16/9024* (2019.01)

(58) Field of Classification Search
None
See application file for complete search history.

(56) References Cited

U.S. PATENT DOCUMENTS 10,146,801 B2 * 12/2018 Savkli ................... G06F 16/245
2012/0173845 A1 7/2012 Venkataramani
(Continued)

FOREIGN PATENT DOCUMENTS

CN 103597519 A 2/2014
CN 108388642 A 8/2018
(Continued)

OTHER PUBLICATIONS

Levandoski J J, Lomet D B, Sengupta S. The Bw-Tree: A B-tree for new hardware platforms[C]//2013 IEEE 29th International Conference on Data Engineering (ICDE). IEEE, 2013: 302-313.
(Continued)

*Primary Examiner* — Umar Mian
(74) *Attorney, Agent, or Firm* — Anova Law Group, PLLC

(57) ABSTRACT

A data query request processing method is provided. In the method, a node device receives a data query request transmitted by another node device for querying data related to a first vertex in a graph database through a first processing model. The data query request carries an identifier of a start vertex. The node device transmits the data query request to a second processing model through the first processing model. The second processing model is configured to process data of the start vertex. The node device determines a third processing model based on the data query request through the second processing model, the third processing model being configured to process data of the first vertex or an intermediate vertex between the start vertex and the first vertex. The node device transmits the data query request to
(Continued)

the third processing model through the second processing model.

18 Claims, 7 Drawing Sheets

(56)                    References Cited

U.S. PATENT DOCUMENTS

| | | |
|---|---|---|
| 2015/0324482 A1 | 11/2015 | Kato et al. |
| 2016/0284018 A1 | 9/2016 | Adeyoola et al. |
| 2017/0124221 A1 | 5/2017 | Song et al. |
| 2017/0124497 A1 | 5/2017 | Crabtree et al. |
| 2017/0364534 A1 | 12/2017 | Zhang et al. |
| 2018/0039673 A1 | 2/2018 | Chen et al. |
| 2018/0039710 A1* | 2/2018 | Chen .................. G06F 16/9024 |
| 2020/0226156 A1 | 7/2020 | Borra et al. |
| 2021/0240705 A1* | 8/2021 | Trigonakis ........ G06F 16/24526 |
| 2022/0179859 A1 | 6/2022 | Faltin et al. |

FOREIGN PATENT DOCUMENTS

| | | |
|---|---|---|
| CN | 109344208 A | 2/2019 |
| CN | 109460491 A | 3/2019 |
| CN | 110309334 A | 10/2019 |
| CN | 110717076 A | 1/2020 |
| CN | 110727760 A | 1/2020 |
| CN | 110941741 A | 3/2020 |
| CN | 113821508 A | 12/2021 |
| CN | 114969165 A | 8/2022 |
| EP | 3499386 A1 | 6/2019 |
| WO | 2014083655 A1 | 6/2014 |

OTHER PUBLICATIONS

Aguilera M K, Golab W, Shah M A. A practical scalable distributed b-tree[J]. Proceedings of the VLDB Endowment, 2008, 1(1): 598-609.
Wu C, Faleiro J M, Lin Y, et al. Anna: A kvs for any scale[J]. IEEE Transactions on Knowledge and Data Engineering, 2019, 33(2): 344-358.
The World Intellectual Property Organization (WIPO) International Search Report for PCT/CN2023/095835 Aug. 22, 2023 6 Pages (including translation).
The State Intellectual Property Office of the People's Republic of China (SIPO) Office Action 1 for 202210891780.8 Sep. 5, 2022 8 Pages (including translation).
The European Patent Office (EPO) The Extended European Search Report for Application No. 23845022.5 Mar. 19, 2025 10 Pages.
The Japan Patent Office (JPO) Notice of Reasons for Refusal for Application No. 2024-560225 Jun. 24, 2025 5 Pages (including translation).

* cited by examiner (a)

Processing model 1

| V1 | Vp1 | | | |
| --- | --- | --- | --- | --- |
| V1_in | V2 | V3 | Ep3 | Ep2 |
| V1_out | V3 | V4 | Ep4 | Ep3 |

| V4 | Vp4 | | | |
| --- | --- | --- | --- | --- |
| V4_in | V1 | V2 | Ep2 | Ep1 |
| V4_out | V3 | Ep3 | | |

Processing model 2

| V2 | Vp2 | | | |
| --- | --- | --- | --- | --- |
| V2_in | V3 | Ep3 | | |
| V2_out | V1 | V4 | Ep4 | Ep1 |

Processing model 3

| V3 | Vp3 | | | |
| --- | --- | --- | --- | --- |
| V3_in | V1 | V4 | Ep4 | Ep1 |
| V3_out | V1 | V2 | Ep2 | Ep1 |

(b)

Receiving module — 1001

Transmitting module — 1002

Determining module — 1003

1

DATA QUERY REQUEST PROCESSING METHOD, ELECTRONIC DEVICE, AND STORAGE MEDIUM

CROSS-REFERENCES TO RELATED APPLICATIONS

This application is a continuation application of PCT Patent Application No. PCT/CN2023/095835, filed on May 23, 2023, which claims priority to Chinese Patent Application No. 202210891780.8, filed on Jul. 27, 2022, all of which is incorporated herein by reference in their entirety.

FIELD OF THE TECHNOLOGY

The present disclosure relates to the field of databases and, in particular, to a data query request processing method and apparatus, a device, and a storage medium.

BACKGROUND OF THE DISCLOSURE

Data based on a graph database is usually stored by using a distributed data storage system. The distributed data storage system stores the data in a slice manner through a plurality of node devices, to support storage of large-scale data.

Each node device storing a data slice jointly manages all data stored on the node device using each core of a multicore processor in the node device. When receiving a data query request for stored data, a node device creates a corresponding thread for the data query request, and processes the data query request through the created thread, to obtain a query result.

When the distributed data storage system receives parallel data query requests, for example, receives data query requests of second-level neighbors configured to query a start vertex in the graph database, the distributed data storage system concurrently queries data stored in different node devices. The node devices receiving the data query request therefore need to create threads for different data query requests. Problems arises, however, as large quantity of threads needs to be generated, which is increasingly time-consuming.

SUMMARY

According to one aspect of the present disclosure, a data query request processing method applied to a first node device is provided, the first node device being one of at least two node devices in a distributed data storage system based on a graph database. The method includes: receiving, by the first node device through a first processing model in the first node device, a data query request transmitted by a second node device, the data query request being configured for querying data related to a first vertex in the graph database, the data query request carrying an identifier of a start vertex, and the first node device storing data of the start vertex; transmitting, by the first node device, the data query request to a second processing model in the first node device through the first processing model, the second processing model being a processing model configured to process the data of the start vertex in the first node device; determining, by the first node device, a third processing model based on the data query request through the second processing model, the third processing model being configured to process data of the first vertex or an intermediate vertex, and the intermediate vertex being a vertex between the start vertex and the first vertex; and transmitting, by the first node device, the data query request to the third processing model through the second processing model.

According to another aspect of the present disclosure, an electronic device, configured as a first node device, is provided, the first node device being one of at least two node devices in a distributed data storage system based on a graph database. The electronic device includes one or more processors, and a memory storing computer programs that, when being executed, causes the one or more processors to perform: receiving, through a first processing model, a data query request transmitted by a second node device, the data query request being configured for querying data related to a first vertex in the graph database, the data query request carrying an identifier of a start vertex, and the first node device storing data of the start vertex; transmitting the data query request to a second processing model in the first node device through the first processing model, the second processing model being a processing model configured to process the data of the start vertex in the first node device; determining a third processing model based on the data query request through the second processing model, the third processing model being configured to process data of the first vertex or an intermediate vertex, and the intermediate vertex being a vertex between the start vertex and the first vertex; and transmitting the data query request to the third processing model through the second processing model.

According to another aspect of the present disclosure, a non-transitory computer-readable storage medium, storing at least one program that, when being executed, causes one or more processors of a first node device to implement a data query request processing method, the first node device being one of at least two node devices in a distributed data storage system based on a graph database. The method includes: receiving, by the first node device through a first processing model in the first node device, a data query request transmitted by a second node device, the data query request being configured for querying data related to a first vertex in the graph database, the data query request carrying an identifier of a start vertex, and the first node device storing data of the start vertex; transmitting, by the first node device, the data query request to a second processing model in the first node device through the first processing model, the second processing model being a processing model configured to process the data of the start vertex in the first node device; determining, by the first node device, a third processing model based on the data query request through the second processing model, the third processing model being configured to process data of the first vertex or an intermediate vertex, and the intermediate vertex being a vertex between the start vertex and the first vertex; and transmitting, by the first node device, the data query request to the third processing model through the second processing model.

DESCRIPTION OF EMBODIMENTS

First, terms involved in the present disclosure are introduced.

Figures 1, 2:
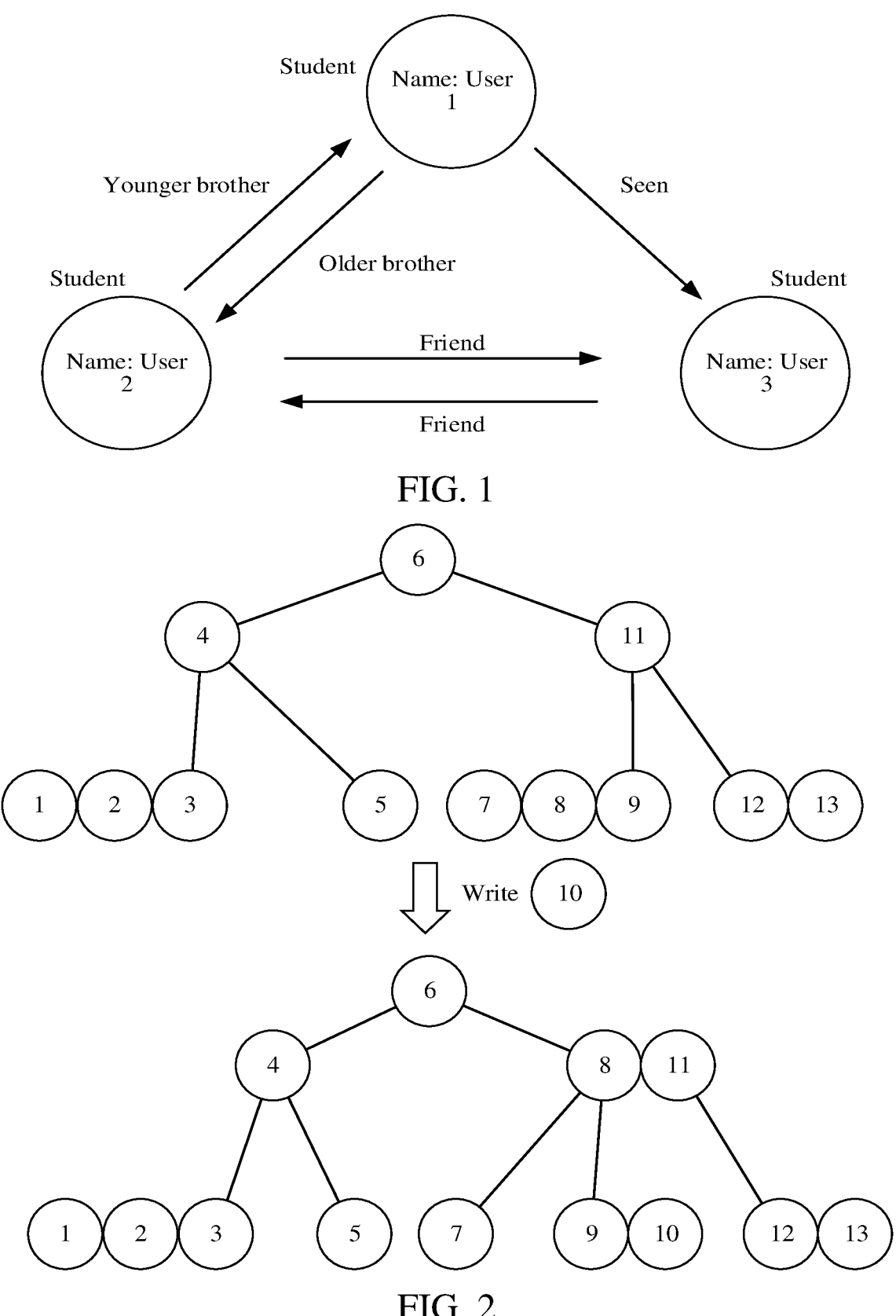
FIG. 1 is a schematic diagram of an attribute graph of a graph database according to an exemplary embodiment of the present disclosure.
FIG. 2 is a schematic diagram of a B tree-based data structure according to an exemplary embodiment of the present disclosure.

Graph database: It is a database that uses a graph structure for semantic query. The graph database represents and stores data by using a vertex, an edge, and an attribute. For example, FIG. 1 is a schematic diagram of an attribute graph of a graph database according to an exemplary embodiment of the present disclosure. As shown in FIG. 1, the attribute graph of the graph database is formed by a vertex (a circle), an edge (an arrow), and an attribute. In FIG. 1, each vertex of three vertices has a tag of a student, attributes of the students include names, and values of the attributes are respectively a user 1, a user 2, and a user 3. An edge between vertices represents a relationship between the vertices, for example, brother, younger brother, and seen. If an edge between two vertices is bidirectional, it indicates that there is an association relationship between data of the two vertices. If an edge between two vertices is unidirectional, it indicates that there is a unidirectional association relationship between data of the two vertices.

Balance tree (B tree): It is a self-balanced tree data structure, which can maintain data in order. The B tree-based data structure allows all actions of data searching, sequential access, data insertion, and data deletion to be completed in a logarithm time, that is, as an amount of data increases, time consumed for data processing increases logarithmically rather than exponentially, with relatively high data processing efficiency.

For example, FIG. 2 is a schematic diagram of a B tree-based data structure according to an exemplary embodiment of the present disclosure. As shown in FIG. 2, the B tree includes seven nodes, and each node is formed by an index of data. A node (6) is referred to as a root node, nodes (4) and (11) are referred to as intermediate nodes, and nodes (1, 2, 3), (5), (7, 8, 9), and (12, 13) are referred to as leaf nodes.

A B+ tree is an improvement on the B tree. A difference from the B tree lies in that a leaf node of the B+ tree includes indexes of all data. Such a B+ tree data structure has relatively good query performance and has a characteristic of a clear representation in a graph representation, so that the B+ tree data structure is widely applied to the graph database. However, processing of concurrent writing (data indexes of a plurality of pieces of data are written simultaneously) of data under such the tree (the B tree and the B+ tree) data structure is relatively troublesome, and the reason lies in that node splitting and merging are involved in a data writing process. Therefore, when a concurrent write operation is generally performed on the B tree/B+ tree, locking processing of different granularities is performed on the B tree/B+ tree, to sequentially write the B tree/B+ tree once. For example, a global tree is locked to implement a write operation. Currently, a locking manner of a finer granularity can also be configured for dealing with a high concurrent write condition.

Still referring to FIG. 2, when an index (10) is written into the B tree, the node (7, 8, 9) is split, and an index (8) is merged into the node (11), to form a node (8, 11). When a plurality of data indexes are written concurrently, the B tree needs to be locked, so that a write request is sequentially processed in a sequential write-once manner. However, this causes relatively low data processing efficiency.

Actor model: It is a concurrent computing mathematical model. The actor model may make a local decision about a to-be-executed task, to respond to a received message (task), and more actor models can also be created, to transmit more messages and determine how to respond to a next received message. A message is directly transmitted between actor models without any medium, and the message is transmitted and processed asynchronously. Communication and interaction between modules is implemented by transmitting messages between different actor models. The philosophy of the actor model is that everything is an actor, which is similar to the philosophy of "everything is an object" applied by some object-oriented programming languages. Therefore, message transmitting of the actor model better conforms to an object-oriented original intension. The actor model belongs to a concurrent component model. An advanced stage of a concurrent programming paradigm is defined in a component manner, to avoid direct contact of a user with a basic concept such as multithread concurrency or a thread pool.

Cloud storage is a new concept extended and developed from a concept of cloud computing. A distributed cloud system (a storage system for short below) is a storage system that integrates a large quantity of storage devices of different types (the storage device is also referred to as a storage node) in a network by using application software or an application interface through functions such as a cluster application, a grid technology, and a distributed file storage system to cooperatively work, jointly providing data storage and service access function to the outside. For example, a distributed data storage system in this embodiment of the present disclosure is a cloud storage system.

Currently, a storage method of the storage system includes: creating a logical volume, and distributing a physical storage space to each logical volume when the logical volume is created. The physical storage space may be formed by a storage device or disks of several storage devices. A client stores data in a logical volume, that is, stores the data in a file system, and the file system divides the data into a plurality of parts, each part being an object, and the object not only including the data but also including additional information such as a data identity (ID). The file system writes each object into a physical storage space of the logical volume, and the file system records storage location information of each object, so that when the client requests accessing to the data, the file system can allow the client to access to the data according to storage location information of each object. A process in which the storage system distributes a physical storage space to a logical volume specifically includes: pre-dividing the physical storage space into stripes according to estimation of a capacity of an object stored in the logical volume (the estimation usually has a large margin relative to an actual capacity of a to-be-stored object) and a redundant array of independent disk (RAID), where one logical volume may be understood as one stripe, so that the physical storage space is distributed for the logical volume.

Database may be considered as an electronic file cabinet, that is, a place for storing an electronic file. A user may perform an operation such as add, query, update, or delete data in the file. The so-called "database" is a data set that is stored together in a particular manner and can be shared by a plurality of users, has as less redundancy as possible, and is independent of an application program. For example, the database in this embodiment of the present disclosure is a graph database, and the data structure adopts the B tree or B+ tree structure.

A database management system (DBMS) is a computer software system designed for managing a database and generally has basic functions such as storage, interception, security assurance, and backup. The database management system may be classified according to a database model supported by the database management system, for example, a relational model or an extensible markup language (XML); or may be classified according to a computer type supported by the database management system, for example, a server cluster or a mobile phone; or may be classified according to a query language used by the database management system, for example, a structured query language (SQL) or an XML data query language (X Query); or may be classified according- ing to performance momentum focus, for example, a maximum scale or a highest running speed; or in another classification manner. Regardless of which classification manner is used, some DBMSs can span categories, for example, supporting a plurality of query languages.

Figure 3:
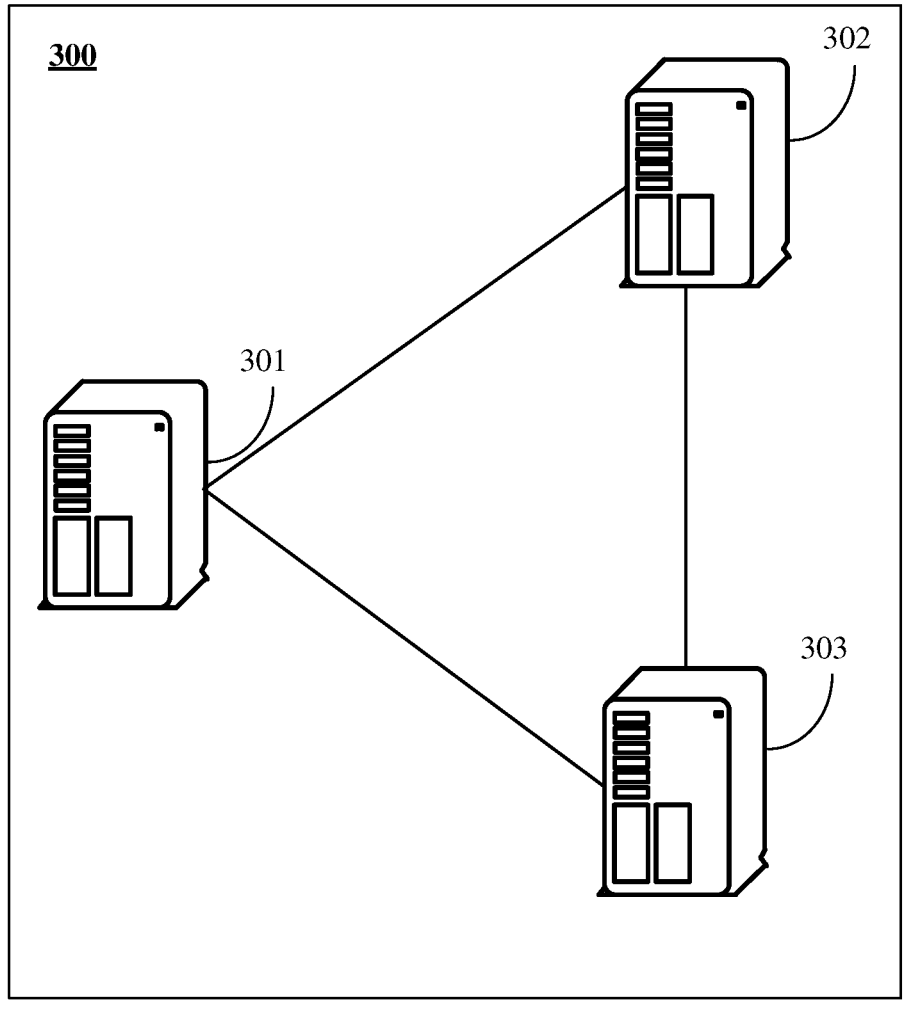
FIG. 3 is a schematic structural diagram of a computer system according to an exemplary embodiment of the present disclosure.

FIG. 3 is a schematic structural diagram of a computer system 300 according to an exemplary embodiment of the present disclosure. As shown in FIG. 3, the computer system 300 includes a first node device 301, a second node device 302, and a third node device 303.

The second node device 302 may be a server, or a server cluster formed by a plurality of servers, or a virtual server in a cloud computing service center, or the like. Optionally, the second node device 302 is a node device configured to schedule a data processing request in a distributed data storage system. For example, the second node device 302 receives an external data query request, and schedules, according to data to be queried by the data query request, the data query request to a node device that stores data that needs to be queried or a node device that stores data related to data that needs to be queried. The second node device 302 may establish a connection to the first node device 301 and the third node device 303 through a wired network or a wireless network.

The first node device 301 and the third node device 303 may be a server, or a server cluster formed by a plurality of servers, or a virtual server in a cloud computing service center, or the like. The first node device 301 and the third node device 303 store same, different, or partially same data slices, to implement distributed storage of data. When dif- ferent node devices store the same data, that is, store a data duplicate, for a data duplicate consistency problem, a conflict-free replicated data type (CRDT) may be configured for converting the consistency problem to a calculation prob- lem, and a locking problem in a process of concurrently modifying data can be reduced in this manner. The first node device 301 may establish a connection to the third node device 303 through a wired network or a wireless network.

A quantity of node devices in the computer system 300 is only used as an example, and does not limit the computer system 300 provided in this embodiment of the present disclosure.

Figure 4:
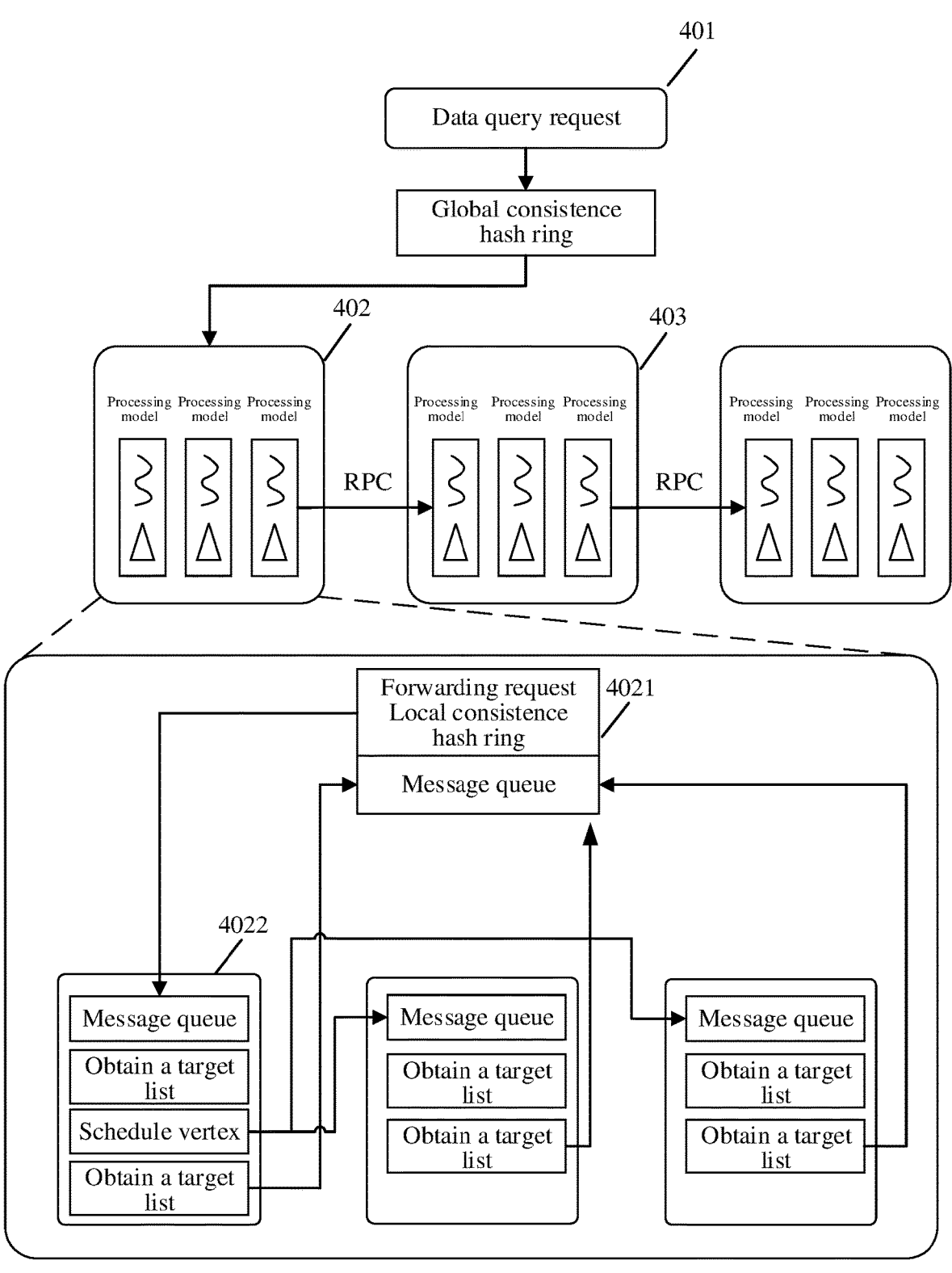
FIG. 4 is a schematic diagram of a data query request processing process according to an exemplary embodiment of the present disclosure.

FIG. 4 is a schematic diagram of a data query request processing process according to an exemplary embodiment of the present disclosure. As shown in FIG. 4, a second node device is a node device in a distributed data storage system based on a graph database. After receiving a data query request 401, the second node device transmits the data query request 401 to a first processing model 4021 in a first node device 402. The data query request is configured for que- rying data related to a first vertex in the graph database, the data query request carries an identifier of a start vertex, and the first node device 402 stores data of the start vertex. The first vertex is also referred to as a target vertex, and the target vertex is a vertex configured to process the data query request. Alternatively, the target vertex is a vertex config- ured to provide a processing result of the data query request.

The first node device 402 transmits the data query request 401 to a second processing model 4022 in the first node device 402 through the first processing model 4021. The second processing model 4022 is a processing model con- figured to process the data of the start vertex in the first node device 402. The first node device 402 determines a third processing model based on the data query request 401 through the second processing model 4022. The third pro- cessing model is configured to process data of the first vertex or an intermediate vertex, and the intermediate vertex is a vertex between the start vertex and the first vertex.

Optionally, when there is the first vertex in vertices connected to the first node device, the first node device 402 can directly determine the first vertex through the second processing model 4022, and determine the third processing model configured to process the data of the first vertex. When there is no first vertex in the vertices connected to the first node device, the first node device 402 determines, through the second processing model 4022, the intermediate vertex connected to the first vertex, and determines the third processing model configured to process the data of the intermediate vertex. After determining the third processing model, the first node device 402 transmits the data query request to the third processing model through the second processing model 4022. When the third processing model is configured to process the data of the first vertex, the third processing model is configured to process the data query request and transmit a processing result of the data query request to the second node device. When the third process- ing model is configured to process the data of the interme- diate vertex, the third processing model is configured to continue to determine a fourth processing model by using the foregoing method and continue to transmit the data query request until the processing result of the data query request is obtained.

Optionally, the third processing model belongs to the first node device 402 or a third node device 403. When the third processing model belongs to the first node device 402, the first node device 402 directly transmits the data query request to the third processing model through the second processing model 4022. When the third processing model belongs to the third node device 403, the first node device 402 transmits, through the second processing model 4022, the data query request to a processing model configured to schedule the data query request in the third node device 403, and then the processing model transmits the data query request to the third processing model.

After a target processing model (for example, the third processing model) configured to process the data of the first vertex is determined in the foregoing manner, the target processing model processes the data query request, and transmits a processing result of the data query request to a processing model configured to schedule the data query request in a node device in which the target processing model is located. Then, the processing model configured to schedule the data query request transmits the processing result of the data query request to the second node device. When a plurality of processing models transmit processing results of the data query request to the second node device, the second node device summarizes the processing results of the data query request transmitted by all the processing models, to finally obtain the processing result of the data query request. Optionally, the processing model is an actor model. The "plurality of" is "at least two" and may be understood as two or more.

The method provided in this embodiment of the present disclosure is applied to a scenario involving a distributed data storage system, a scenario involving big data processing, a scenario involving processing of training data related to a machine learning model, a scenario involving processing of data in applications (including applications in social, a short video, instant messaging, game, electronic commerce, financial, and other fields), a scenario involving data search (for example, a commodity search scenario), and the like.

For example, when the method provided in this embodiment of the present disclosure is applied to the scenario of processing of data of a social application, a vertex in a graph database represents data related to a user account, an edge between vertices represents that there is an association relationship between user accounts, and an attribute of the edge is configured for reflecting an attribute of the association relationship, for example, a friend relationship, a defriend relationship, or a shielding relationship. A node device is a back-end server of the social application, and a processing model is an actor model in the back-end server. For example, a start node is a node corresponding to a first user account, and a target node is a node corresponding to a second user account that establishes a friend relationship with the first user account for the longest time in friend accounts of the first user account. By using the method provided in this embodiment of the present disclosure, the second user account meeting a condition of establishing a friend relationship for the longest time can be queried in the friend accounts of the first user account, so that data related to the second user account can be queried.

For example, when the method provided in this embodiment of the present disclosure is applied to the scenario of processing of data of a short video application, a vertex in a graph database represents data related to a user account, an edge between vertices represents that there is an association relationship between user accounts, and an attribute of the edge is configured for reflecting an attribute of the association relationship, for example, a follow relationship, a liking relationship, or a favorites relationship. A node device is a back-end server of the short video application, and a processing model is an actor model in the back-end server. For example, a start node is a node corresponding to a third user account, and a target node is a node corresponding to a fourth user account following the third user account in user accounts followed by the third user account. By using the method provided in this embodiment of the present disclosure, the fourth user account meeting a condition of following the third user account can be queried in the user accounts followed by the third user account, so that data related to the fourth user account can be queried.

For example, when the method provided in this embodiment of the present disclosure is applied to the scenario of processing of data of a game application, a vertex in a graph database represents data related to a user account, an edge between vertices represents that there is an interaction behavior between user accounts, and an attribute of the edge is configured for reflecting an attribute of the interaction behavior, for example, reflecting that there is a behavior of trading a virtual item between user accounts. A node device is a back-end server of the game application, and a processing model is an actor model in the back-end server. For example, a start node is a node corresponding to a fifth user account, and a target node is a node corresponding to a sixth user account having a highest price of a traded virtual item in user accounts having behaviors of trading virtual items with the fifth user account. By using the method provided in this embodiment of the present disclosure, the sixth user account meeting a condition that the price of the trade virtual item is the highest can be queried in the user accounts having the behaviors of trading virtual items with the fifth user account, so that data related to the sixth user account can be queried.

Optionally, the method provided in this embodiment of the present disclosure is further applied to scenarios such as a cloud technology, artificial intelligence, Internet of vehicles, an intelligent transportation, and driving assistance and is configured for processing related data involved in the scenarios. When the method is applied to the scenario related to the Internet of vehicles, the node device can alternatively be an in-vehicle device, and the in-vehicle device may be a vehicle terminal.

After receiving a data query request, a node device can directly process the data query request through a processing model in the node device, determine a processing model configured to process data of a vertex (related to the data query request in a graph database), or determine a processing result of the data query request. In a process of processing the data query request, the data query request is directly processed through the processing model without creating a thread, which can avoid creating a corresponding thread when the data query request is processed, thereby accelerating data query.

Figures 5, 6:
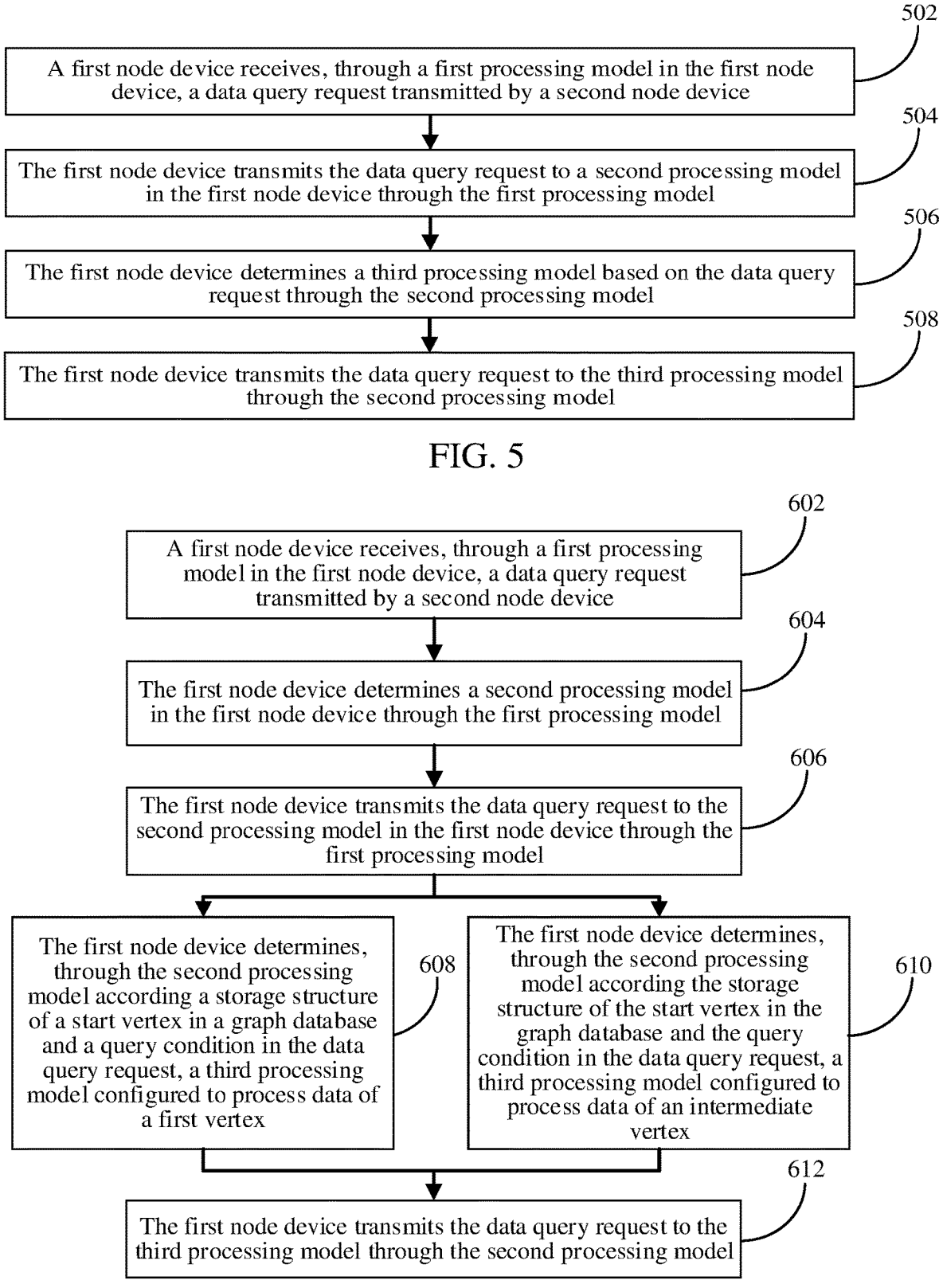
FIG. 5 is a schematic flowchart of a data query request processing method according to an exemplary embodiment of the present disclosure.
FIG. 6 is a schematic flowchart of another data query request processing method according to an exemplary embodiment of the present disclosure.

FIG. 5 is a schematic flowchart of a data query request processing method according to an exemplary embodiment of the present disclosure. The method is applied to the first node device in the system shown in FIG. 3, and the first node device is one of a plurality of node devices in a distributed data storage system based on a graph database. As shown in FIG. 5, the method includes the following steps.

Step 502: The first node device receives, through a first processing model in the first node device, a data query request transmitted by a second node device.

The second node device is a node device configured to schedule the data query request in the distributed data storage system, and the second node device may be further configured to schedule data processing requests such as a data write request, a data deletion request, and a data modification request.

The data query request is configured for querying data related to a first vertex in the graph database, and the data query request carries an identifier of a start vertex. Optionally, the data query request is configured for querying the first vertex based on the start vertex, querying data of the first vertex based on the start vertex, querying a path between the start vertex and the first vertex (an edge in the graph database), querying an edge between the start vertex and the first vertex or an attribute of an edge, and querying a submap including the start vertex and the first vertex in the graph database. Optionally, the data query request can further carry an identifier of the first vertex, for example, the data query request is configured for querying the path between the start vertex and the first vertex.

For example, the data query request is configured for querying data of a two-level neighbor of the start vertex, that is, querying data of a vertex connected to an intermediate vertex. The intermediate vertex is connected to the start vertex, and the intermediate vertex is connected to the first vertex. In this case, there are one or more intermediate vertices, and there are one or more first vertices.

The first node device stores data of the start vertex. After receiving a data query request, the second node device determines a node device storing the data of the start vertex and transmits the data query request to a processing model in the node device.

The node device includes at least the following two processing models: a processing model for task schedule, for example, a processing model configured to schedule a data query request and a data processing request; and a processing model configured to manage a data slice. One processing model may manage one or more data slices, for example, the first node device may include a processing model configured to manage a data slice of a vertex 1 and a processing model configured to manage data slices of a vertex 2 and a vertex 3.

The first processing model is a model configured to schedule the data query request (the data processing request) in the first node device, that is, the first processing model is the processing model for task schedule. After receiving the data query request, the first processing model transmits the data query request to a processing model configured to process the data of the start vertex in the first node device. Optionally, the first processing model does not have data of a vertex that needs to be processed. There is a processing model having the same function as the first processing model in the node device storing the data of the vertex in the distributed data storage system. Optionally, the second node device stores addresses of processing models configured to schedule the data query request in different node devices. After determining the first node device, the second node device transmits the data query request to an address corresponding to the first processing model.

Optionally, there are a plurality of start vertices. In this case, the second node device splits the data query request according to the start vertices, determines a node device corresponding to each data query request, and transmits a corresponding data query request to a corresponding processing model in the determined node device.

Step 504: The first node device transmits the data query request to a second processing model in the first node device through the first processing model.

The second processing model is a processing model configured to process the data of the start vertex in the first node device, that is, the second processing model is the processing model configured to manage the data slice. Optionally, all data slices of a plurality of vertices stored in the first node device have corresponding processing models. After receiving the data query request, the first processing model determines, according to the identifier of the start vertex, a processing model configured to process the data of the start vertex in the first node device, to determine the second processing model.

Optionally, the first node device can determine the second processing model according to a local consistence hash ring through the first processing model, and then transmit the data query request to the second processing model. The local consistence hash ring is configured for reflecting a correspondence between a data slice of each vertex stored in the first node device and a processing model in the first node device. Optionally, when there are a plurality of start vertices, the first node device also splits the data query request through the first processing model before transmitting.

Optionally, the first processing model locally stores metadata of an address of each processing model in the first node device. The first node device transmits the data query request to the determined second processing model according to the metadata through the first processing model.

Step 506: The first node device determines a third processing model based on the data query request through the second processing model.

The third processing model is configured to process data of the first vertex or an intermediate vertex, and the intermediate vertex is a vertex between the start vertex and the first vertex, that is, the third processing model is the processing model configured to manage the data slice. For example, when the start vertex is connected to the first vertex and a query condition in the data query request is met, the third processing model is configured to process the data of the first vertex. When there is also the intermediate vertex between the start vertex and the first vertex, the third processing model is configured to process the data of the intermediate vertex. Optionally, the intermediate vertex is connected to the start vertex (there is an edge connecting the intermediate vertex and the start vertex in the graph database).

Optionally, when the second processing model processes the data query request, to obtain some query results of the data query request, for example, querying a path between the start vertex and the first vertex, the first node device transmits the determined query results to the first processing model through the second processing model, then the first node device transmits the query results to the second node device through the first processing model, and the second node device summarizes the received query results of the data query request.

The third processing model is a processing model in the first node device or a processing model in a third node device.

Step 508: The first node device transmits the data query request to the third processing model through the second processing model.

When the start vertex is connected to the first vertex and the query condition in the data query request is met, that is, when the third processing model is configured to process the data of the first vertex, the third processing model is configured to process the data query request and transmit a processing result of the data query request to the second node device. When there is the intermediate vertex between the start vertex and the first vertex, the third processing model is configured to continue to determine a fourth processing model according to the foregoing method and continue to transmit the data query request to the fourth processing model. Then, the fourth processing model continues to process the data query request according to the foregoing method until the processing result of the data query request is finally obtained. The fourth processing model is a model configured to schedule the data query request (the data processing request) in the third node device, that is, the fourth processing model is the processing model for task schedule.

Optionally, the second processing model locally stores metadata of an address of a processing model configured to process data of a vertex connected to the start vertex. The first node device transmits the data query request to the third processing model according to the metadata through the second processing model.

Based on the foregoing, according to the method provided in this embodiment, after receiving a data query request, a node device can directly process the data query request through a processing model in the node device, determine a processing model configured to process data of a vertex related to the data query request in a graph database, and determine a processing result of the data query request. In a process of processing the data query request, the data query request is directly processed through the processing model without creating a thread, which can avoid creating a corresponding thread when the data query request is processed, thereby accelerating data query.

FIG. 6 is a schematic flowchart of another data query request processing method according to an exemplary embodiment of the present disclosure. The method is applied to the first node device in the system shown in FIG. 3, and the first node device is one of a plurality of node devices in a distributed data storage system based on a graph database. As shown in FIG. 6, the method includes the following steps.

Step 602: The first node device receives, through a first processing model in the first node device, a data query request transmitted by a second node device.

The second node device is a node device configured to schedule a data query request in the distributed data storage system. The data query request is configured for querying data related to a first vertex in the graph database, and the data query request carries an identifier of a start vertex.

After receiving a data query request, the second node device determines a node device storing the data of the start vertex and transmits the data query request to a processing model in the node device. The first node device stores data of the start vertex. Optionally, each node device in the distributed data storage system stores a data slice of at least one vertex in the graph database, and a correspondence between data slices of vertices stored in the node devices and the node devices is established through a global consistence hash ring. For example, a node device 1 stores a data slice of a vertex 1 in the graph database, a node device 2 stores data slices of a vertex 2 and a vertex 3 in the graph database, and a node device 3 stores a data slice of a vertex 4 in the graph database. A correspondence between the node devices and the vertices in the graph database may be established through the global consistence hash ring.

For example, a modulo operation can be performed on an identifier of a node device, to obtain a fixed value. A modulo operation can also be performed on an identifier of each vertex in the graph database, to obtain a fixed value. For example, the modulo operation is performed by using $2^{\wedge}32$. Result values obtained by performing the modulo operation on $2^{\wedge}32$ by using the identifiers of the node devices or the identifiers of the vertices can form a circular ring, and the circular ring may be referred to as the global consistence hash ring. Similar to a clock, a circle of the clock may be understood as a circle formed by 60 points, and the global consistence hash ring may be imagined as a circle formed by $2^{\wedge}32$ points. The values obtained through the modulo operation are locations of different vertices or node devices on the global consistence hash ring. Then, a node device may be found on the global consistence hash ring in a clockwise direction based on a location of a vertex on the global consistence hash ring, and the found first node device is determined as a node device configured to store a data slice of the vertex. $2^{\wedge}32$ configured for the modulo operation is only used as an example, and another value may alternatively be used. "A" represents exponentiation, for example, "$2^{\wedge}32$" is $2^{32}$.

After receiving the data query request, the second node device determines a second location on the global consistence hash ring according to the identifier of the start vertex, and then can determine the first node device corresponding to the data query request according to the second location and a location of each node device of the distributed data storage system on the global consistence hash ring. Optionally, the second node device does not store data of the vertex in the graph database.

Figures 7, 8:
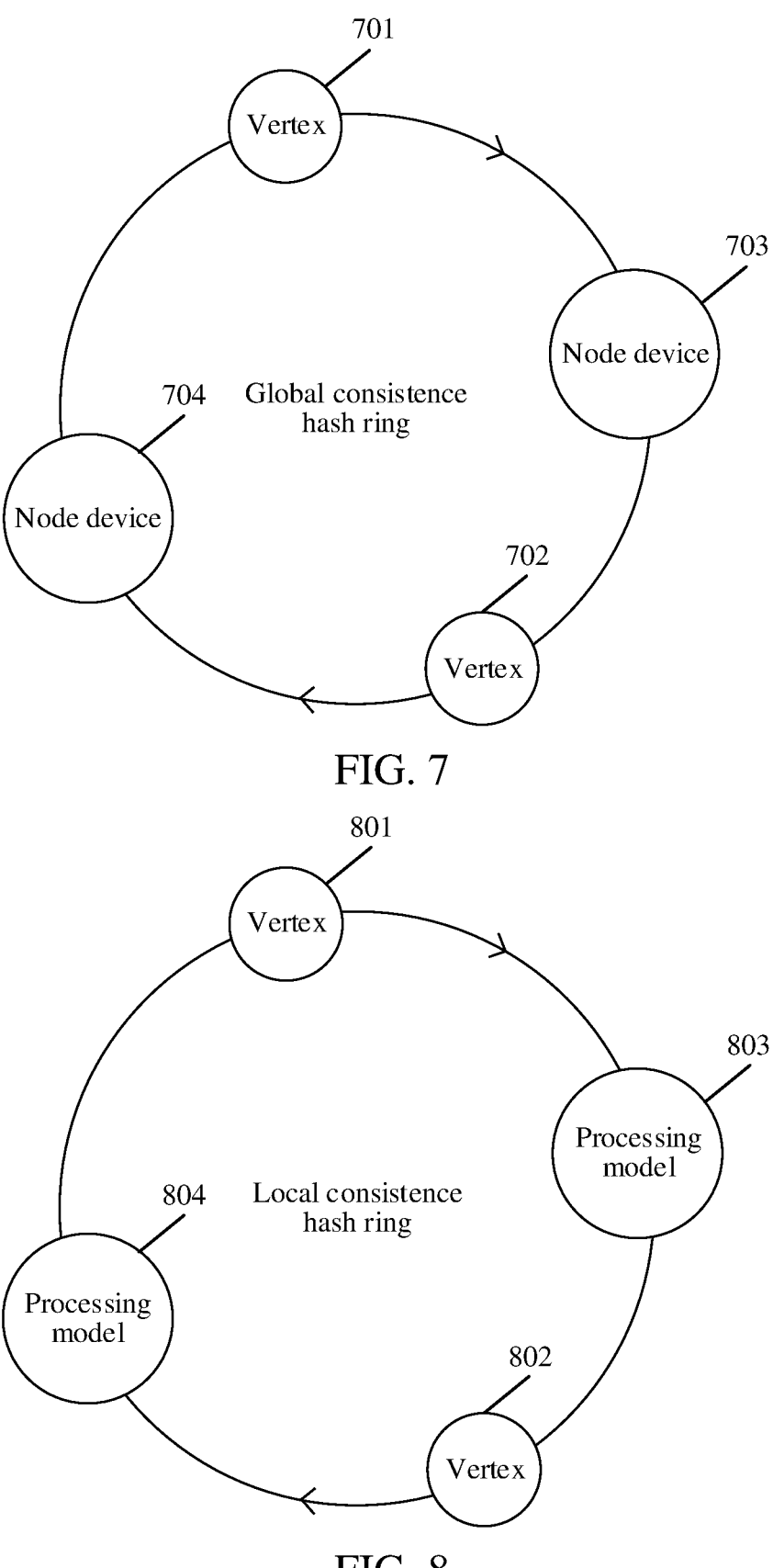
FIG. 7 is a schematic diagram of a global consistence hash ring according to an exemplary embodiment of the present disclosure.
FIG. 8 is a schematic diagram of a local consistence hash ring according to an exemplary embodiment of the present disclosure.

For example, FIG. 7 is a schematic diagram of a global consistence hash ring according to an exemplary embodiment of the present disclosure. As shown in FIG. 7, after receiving the data query request, the second node device calculates a hash value according to the identifier of the start vertex, and determines the second location on the global consistence hash ring according to the hash value. For example, the second location is a location of a vertex 701. Then a $1^{st}$ node device, that is, a node device 703, is found clockwise on the global consistence hash ring, and the node device 703 is determined as the first node device. A location of a node device on the global consistence hash ring is determined by calculating a hash value of an identifier of the node device. Alternatively, the second location is a location of a vertex 702. In this case, the second node device finds a $1^{st}$ node device, that is, a node device 704, clockwise on the global consistence hash ring, and in this case, the second node device determines the node device 704 as the first node device.

The first processing model is a model configured to schedule the data query request in the first node device. After receiving the data query request, the first processing model transmits the data query request to a processing model configured to process the data of the start vertex in the first node device.

Step 604: The first node device determines a second processing model in the first node device through the first processing model.

The second processing model is a processing model configured to process the data of the start vertex in the first node device. Optionally, all data slices of a plurality of vertices stored in the first node device have corresponding processing models. After receiving the data query request, the first processing model determines, according to the identifier of the start vertex, a processing model configured to process the data of the start vertex in the first node device, to determine the second processing model.

Optionally, the first node device stores data slices of a plurality of vertices in the graph database, and a correspondence between each data slice and a processing model in the first node device is established through a local consistence hash ring. The first node device can determine a first location on the local consistence hash ring according to the identifier of the start vertex through the first processing model. Then, the first node device can determine the second processing model corresponding to the data query request according to the first location and a location of each processing model in the first node device on the local consistence hash ring through the first processing model.

For example, FIG. 8 is a schematic diagram of a local consistence hash ring according to an exemplary embodiment of the present disclosure. As shown in FIG. 8, after the first processing model receives the data query request, the first node device calculates a hash value according to the identifier of the start vertex through the first processing model, and determines the first location on the local consistence hash ring according to the hash value. For example, the first location is a location of a vertex 801. Then a 1$^{st}$ processing model, that is, a processing model 803, is found clockwise on the local consistence hash ring, and the processing model 803 is determined as the second processing model. A location of a processing model on the local consistence hash ring is determined by calculating a hash value of an identifier of the processing model. Alternatively, the first location is a location of a vertex 802. In this case, the first node device finds a 1$^{st}$ processing model, that is, a processing model 804, clockwise on the local consistence hash ring through the first processing model, and in this case, the first node device determines the processing model 804 as the second processing model through the first processing model.

Step 606: The first node device transmits the data query request to the second processing model in the first node device through the first processing model.

Optionally, the first node device transmits the data query request to a message queue of the second processing model through the first processing model. The message queue of the second processing model is configured to store a task for processing (e.g., a to-be-processed task) of the second processing model. Optionally, the second processing model sequentially processes tasks in the message queue until processing of all tasks are completed.

Step 608: The first node device determines, through the second processing model according to a storage structure of a start vertex in a graph database and a query condition in the data query request, a third processing model configured to process data of a first vertex.

The storage structure of the start vertex in the graph database includes an attribute of the start vertex, an identifier of a vertex having a connection relationship with the start vertex, and an attribute of the connection relationship. Optionally, the vertex having the connection relationship with the start vertex may be divided into a vertex connected to the start vertex and having an edge pointing to the start vertex and a vertex connected to the start vertex and having an edge pointing to the vertex connected to the start vertex. The attribute of the connection relationship includes attributes of edges in different directions.

Optionally, each processing model stores a resource related to a vertex corresponding to the processing model, that is, stores a storage structure of a vertex that the processing model is responsible for processing. For example, a processing model 1 is configured to process data of a vertex 1 and a vertex 4, a processing model 2 is configured to process data of a vertex 2, and a processing model 3 is configured to process data of a vertex 3. The processing model 1 stores a storage structure of the vertex 1 and a storage structure of the vertex 4, the processing model 2 stores a storage structure of the vertex 2, and the processing model 3 stores a storage structure of the vertex 3.

Figures 9, 10:
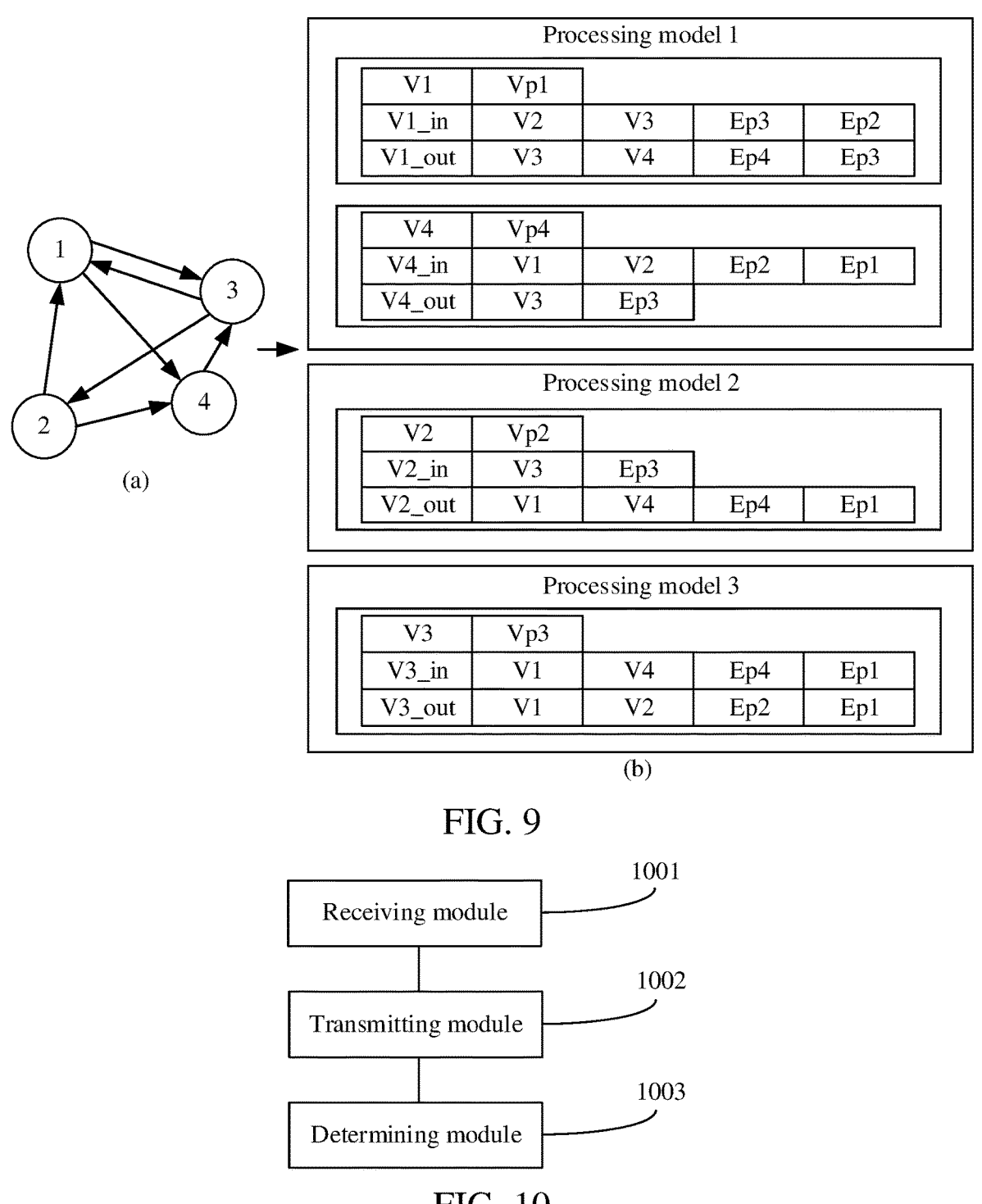
FIG. 9 is a schematic diagram of a storage structure of a vertex in a graph database according to an exemplary embodiment of the present disclosure.
FIG. 10 is a schematic structural diagram of a data query request processing apparatus according to an exemplary embodiment of the present disclosure.

For example, FIG. 9 is a schematic diagram of a storage structure of a vertex in a graph database according to an exemplary embodiment of the present disclosure. As shown in (a) in FIG. 9, in a graph database, a vertex 1 is respectively connected to a vertex 2, a vertex 3, and a vertex 4. An edge between the vertex 1 and the vertex 2 points to the vertex 1, edges between the vertex 1 and the vertex 3 respectively point to the vertex 1 and the vertex 3, and an edge between the vertex 1 and the vertex 4 points to the vertex 4. The vertex 2 is connected to the vertex 3, and an edge between the vertex 2 and the vertex 3 points to the vertex 2. The vertex 2 is connected to the vertex 4, and an edge between the vertex 2 and the vertex 4 points to the vertex 4. The vertex 3 is connected to the vertex 4, and an edge between the vertex 3 and the vertex 4 points to the vertex 3.

As shown in (b) in FIG. 9, a processing model 1 is configured to process data of the vertex 1 and the vertex 4, a processing model 2 is configured to process data of the vertex 2, and a processing model 3 is configured to process data of the vertex 3. The processing model 1 stores storage structures of the vertex 1 and the vertex 4, where Vp1 represents an attribute of the vertex 1 (V1), and V1_in includes an identifier of a vertex whose edge points to the vertex 1 in vertices connected to the vertex 1 and an attribute of the edge between the vertex and the vertex 1, for example, Ep3 represents an attribute of the edge pointing to the vertex 1 between the vertex 1 and the vertex 3, and Ep2 represents an attribute of the edge pointing to the vertex 1 between the vertex 1 and the vertex 2. V1_out includes an identifier of a vertex whose edge points to the connected vertex in the vertices connected to the vertex 1 and an attribute of the edge between the vertex and the vertex 1. Vp4 represents an attribute of the vertex 4 (V4), V4_in includes an identifier of a vertex whose edge points to the vertex 4 in vertices connected to the vertex 4, and V4_out includes an identifier of a vertex whose edge points to the connected vertex in the vertices connected to the vertex 4 and an attribute of the edge between the vertex and the vertex 4. The processing model 2 stores a storage structure of the vertex 2, where Vp2 represents an attribute of the vertex 2 (V2), V2_in includes an identifier of a vertex whose edge points to the vertex 2 in vertices connected to the vertex 2, and V2_out includes an identifier of a vertex whose edge points to the connected vertex in the vertices connected to the vertex 2 and an attribute of the edge between the vertex and the vertex 2. The processing model 3 stores a storage structure of the vertex 3, where Vp3 represents an attribute of the vertex 3 (V3), V3_in identifier of a vertex whose edge points to the vertex 3 in vertices connected to the vertex 3, and V3_out includes an identifier of a vertex whose edge points to the connected vertex in the vertices connected to the vertex 3 and an attribute of the edge between the vertex and the vertex 3.

The first node device queries, through the second processing model according to one or at least two of the attribute of the start vertex, the vertex having the connection relationship with the start vertex, and the attribute of the connection relationship, the vertex having the connection relationship with the start vertex for a vertex meeting the query condition. When there is the vertex meeting the query condition in the vertices having the connection relationship with the start vertex, the first node device determines, through the second processing model, the vertex meeting the query condition as the first vertex. Then the first node device can determine, through the second processing model, the third processing model configured to process the data of the first vertex. Optionally, the second processing model stores information about a processing model configured to process data of a vertex connected to the processing model. After the first vertex connected to the processing model is determined, the third processing model can be determined according to the data.

For example, still referring to FIG. 9, the data query request is configured for querying a first-level neighbor of the vertex 1 for data of a vertex whose edge points to the vertex 1 and an attribute of the edge meets the query condition. The first node device determines the vertex 2 as the first vertex through the second processing model according to the storage structure of the vertex 1, and then may determine the third processing model configured to process data of the vertex 2.

Step 610: The first node device determines, through the second processing model according to the storage structure of the start vertex in the graph database and the query condition in the data query request, a third processing model configured to process data of an intermediate vertex.

The intermediate vertex is a vertex between the start vertex and the first vertex. When the first node device queries the storage structure of the start vertex through the second processing model according to the method in step 608, when there is no vertex meeting the query condition in the vertices having the connection relationship with the start vertex, the first node device determines, through the second processing model, the vertex having the connection relationship with the start vertex as the intermediate vertex, for example, determines all the vertices having the connection relationship with the start vertex as the intermediate vertices. Then the first node device determines, through the second processing model, the third processing model configured to process the data of the intermediate vertices. Optionally, the second processing model stores information about a processing model configured to process data of a vertex connected to the processing model. After the intermediate vertex connected to the processing model is determined, the third processing model can be determined according to the data.

For example, still referring to FIG. 9, the data query request is configured for querying a second-level neighbor of the vertex 1. If the vertex 1 is not directly connected to the vertex 4, the first node device can query, through the second processing model according to the storage structure of the vertex 1, for only the vertex 2 and the vertex 3 that are connected, in this case, determines the vertex 2 and the vertex 3 as intermediate vertices, and determines both a processing model configured to process data of the vertex 2 and a processing model configured to process data of the vertex 3 as the third processing models.

Step 612: The first node device transmits the data query request to the third processing model through the second processing model.

When the third processing model belongs to the first node device, the first node device transmits the data query request to the third processing model in the first node device through the second processing model.

When the third processing model belongs to a third node device, the first node device transmits the data query request to a fourth processing model in the third node device through the second processing model, the fourth processing model being a processing model configured to schedule the data query request in the third node device. The third node device is configured to transmit the data query request to the third processing model through the fourth processing model, so that the third processing model can receive the data query request.

Optionally, when the data query request is transmitted across the node devices, for example, when the first node device transmits the data query request to the fourth processing model in the third node device through the second processing model, the data query request is transmitted to the fourth processing model based on a remote procedure call (RPC). The first node device transmits the data query request to a message queue of the third processing model (the fourth processing model) through the second processing model.

When the start vertex is connected to the first vertex and the query condition in the data query request is met, that is, when the third processing model is configured to process the data of the first vertex, the third processing model is configured to process the data query request and transmit a processing result of the data query request to the second node device. When there is the intermediate vertex between the start vertex and the first vertex, that is, when the third processing model is configured to process the data of the intermediate vertex, the third processing model is configured to continue to determine the fourth processing model according to the foregoing method and continue to transmit the data query request to the fourth processing model. Then, the fourth processing model continues to process the data query request according to the foregoing method until the processing result of the data query request is finally obtained.

For example, when the third processing model determines the processing result of the data query request, that is, when the third processing model is configured to process the data of the first vertex, the node device in which the third processing model is located is configured to transmit, through the third processing model, the processing result of the data query request to a processing model configured to schedule the data query request in the node device in which the third processing model is located. Then, the node device in which the third processing model is located is further configured to transmit the processing result of the data query request to the second node device through the processing model configured to schedule the data query request.

Optionally, when a plurality of processing models transmits processing results of the data query request to the second node device, for example, querying paths between the start vertex and the first vertex, a plurality of edges need to be queried and fed back to the second node device. In this case, the second node device summarizes the processing results of the data query request transmitted by all the processing models, to finally obtain the processing result of the data query request.

Optionally, a plurality of threads of each processor core of the first node device are bound to the plurality of processing models in the first node device, so that each thread can independently run a processing model, thereby avoiding resource preemption between the processing models. The processing models in the distributed data storage system are all actor models, for example, the first processing model, the second processing model, the third processing model, and the fourth processing model are the actor models. Optionally, the first node device includes a plurality of hard disks configured to store data, and the hard disk has a binding relationship with a processor core of the second node device. Through the binding relationship, each actor model can have own independent storage and computing resources, and can implement lock-free processing in the data processing process.

The method provided in this embodiment of the present disclosure may also be configured for processing a data processing request in addition to processing the data query request. When processing the data processing request, the second node device determines, according to an identifier of a vertex carried by the data processing request, a node device storing data of the vertex, and transmits the data processing request to a processing model configured to schedule the data processing request (the data query request) in the node device. Then, the processing model transmits the data processing request to a processing model configured to process the data of the vertex in the node device, and the processing model responsible for processing the data of the vertex processes the data processing request. In the scenario, data of vertices in the graph database is stored in the node device in a slice manner, and different processing models in the node device are responsible for data processing of data of different vertices. When concurrent processing can be performed on the data of different vertices, the database does not need to be locked, and different processing models concurrently process the data of different vertices, to improve data processing efficiency. When a data structure based on a B tree or B+ tree is used, locking of different granularities on the tree can be avoided, thereby improving the data processing efficiency.

For a synchronous locking problem of conventional data modification, according to the method provided in this embodiment of the present disclosure, a data slice is adjusted according to a feature of an existing multi-core processor. Each data slice is managed by an independent actor model, and the actor model is not bound to a core of a specified central processing unit (CPU). In this way, a logic slice on each conventional node device can be converted into a real physical slice, and data is managed in a finer granularity, which is more adaptable to a scenario of high concurrency modification. In addition, this fine-granularity management manner also makes the scalability more flexible, especially applied to an expansion requirement on a cloud.

Based on the foregoing, according to the method provided in this embodiment, after receiving a data query request, a node device can directly process the data query request through a processing model in the node device, determine a processing model configured to process data of a vertex related to the data query request in a graph database, and determine a processing result of the data query request. In a process of processing the data query request, the data query request is directly processed through the processing model without creating a thread, which can avoid creating a corresponding thread when the data query request is processed, thereby accelerating data query.

According to the method provided in this embodiment, a convenient manner of determining the third processing model is further provided by determining the third processing model according to the storage structure of the start vertex in the graph database.

According to the method provided in this embodiment, when the first vertex is determined according to the storage structure, it is further determined that the third processing model configured to process the first vertex processes the data query request, so that the data query request can be quickly distributed to a corresponding processing model for processing.

According to the method provided in this embodiment, when the intermediate vertex is determined according to the storage structure, it is further determined that the third processing model configured to process the intermediate vertex processes the data query request, so that the third processing model can continue to query the first vertex according to the data query request.

According to the method provided in this embodiment, a vertex for which each processing model in each node device is responsible is further maintained through the local consistence hash ring. Therefore, a quantity of processing models in each node device can be dynamically increased or reduced without affecting a relationship between a processing model and a corresponding vertex.

According to the method provided in this embodiment, the data query request is further transmitted to a message queue of the processing model, and the request is processed immediately after the message queue of the processing model has the message. In this way, request processing efficiency can be improved.

According to the method provided in this embodiment, a manner of scheduling the data query request is further provided by transmitting the data query request to a processing model configured to schedule the request in different node devices.

According to the method provided in this embodiment, a manner of transmitting the data query request is further provided by transmitting the data query request to processing models in different node devices.

According to the method provided in this embodiment, when transmission is performed across node devices, a manner of transmitting the data query request across node devices is further provided by performing transmission in a RPC manner.

According to the method provided in this embodiment, in a data query process, a manner of directly pushing a query result after the query result is determined implements high-performance query compared with a conventional manner of pulling a query result level by level.

According to the method provided in this embodiment, a manner of efficiently determining a data query result is provided by summarizing the processing results of the data query request.

According to the method provided in this embodiment, by binding the processing model to the thread of the processor core, and by increasing or decreasing the processor core, a function of scaling out/in the processing model at the processor core level can be further implemented.

According to the method provided in this embodiment, a model configured to process the data query request is further provided by processing the data query request by the actor model.

A chronological order of steps of the method provided in the embodiments of the present disclosure may be properly adjusted, and the steps may also be correspondingly added or deleted according to a situation. Any variation readily figured out by a person skilled in the art within the technical scope disclosed in the present disclosure shall fall within the protection scope of the present disclosure, and details are not described herein again.

In a specific example, still referring to FIG. 4, the data query request is configured for querying a second-level neighbor of a vertex m (id=$id), and the data query request may be represented as Match(m)-[*2]→(n), where id(m)= $id return n. When a user transmits a data query request to a query layer (that is, the second node device) of the distributed data storage system, the query layer transmits, according to a global data slice configuration (the global consistence hash ring), the data query request to a node device storing data of the vertex m. After receiving the data query request, the node device transmits, according to a local data slice rule (the local consistence hash ring) through an actor model configured to perform scheduling, the data query request to a message queue of an actor model responsible for processing the data of the vertex m. After receiving a message (the data query request), the actor model parses the message, and executes a corresponding instruction according to a message instruction. For example, in this case, the actor model obtains all first-level neighbors of the vertex m, and then distributes the message to actor models related to the first-level neighbors by invoking a dispatch vertex function. In addition, data involving a second-level neighbor found by the actor model is transmitted to a message queue of an actor model responsible for query distribution in the node device, feeding back some query results to the query layer. In addition, after receiving the message, other actor models that receive the message query locally according to information in the message, and return query results to the actor model configured for query distribution in the node device, feeding back some query results to the query layer. When a message is transmitted across node devices, the message is transmitted to the actor model responsible for query distribution in the node device, and the actor model performs the above distribution operation and finally returns a data query result to the query layer. The query process may be analogous to: Map (Actors[DestList ( )], GetDestList( )), and the semantics thereof is to apply a method of obtaining a target list (GetDestList( )) to the relevant actor model, and then summarize all returned data to finally obtain the processing result of the data query request.

FIG. 10 is a schematic structural diagram of a data query request processing apparatus according to an exemplary embodiment of the present disclosure. The apparatus is one of a plurality of node devices in a graph database-based distributed data storage system. As shown in FIG. 10, the apparatus includes the following modules.

A receiving module 1001 is configured to receive, through a first processing model in the apparatus, a data query request transmitted by a second node device, the data query request being configured for querying data related to a first vertex in the graph database, the data query request carrying an identifier of a start vertex, and the apparatus storing data of the start vertex.

A transmitting module 1002 is configured to transmit the data query request to a second processing model in the apparatus through the first processing model, the second processing model being a processing model configured to process the data of the start vertex in the apparatus.

A determining module 1003 is configured to determine a third processing model based on the data query request through the second processing model, the third processing model being configured to process data of the first vertex or an intermediate vertex, and the intermediate vertex being a vertex between the start vertex and the first vertex.

The transmitting module 1002 is configured to transmit the data query request to the third processing model through the second processing model.

In an optional design, the determining module 1003 is configured to:

determine the third processing model according to a storage structure of the start vertex in the graph database and a query condition in the data query request through the second processing model.

In an optional design, the storage structure of the start vertex in the graph database includes an attribute of the start vertex, an identifier of a vertex having a connection relationship with the start vertex, and an attribute of the connection relationship. The determining module 1003 is configured to:

query, through the second processing model according to one or at least two of: the attribute of the start vertex, the vertex having the connection relationship with the start vertex, and the attribute of the connection relationship, the vertex having the connection relationship with the start vertex for a vertex meeting the query condition;

when there is the vertex meeting the query condition in the vertices having the connection relationship with the start vertex, determine, through the second processing model, the vertex meeting the query condition as the first vertex; and determine, through the second processing model, the third processing model configured to process the data of the first vertex.

In an optional design, the storage structure of the start vertex in the graph database includes an attribute of the start vertex, an identifier of a vertex having a connection relationship with the start vertex, and an attribute of the connection relationship. The determining module 1003 is configured to:

query, through the second processing model according to one or at least two of: the attribute of the start vertex, the vertex having the connection relationship with the start vertex, and the attribute of the connection relationship, the vertex having the connection relationship with the start vertex for a vertex meeting the query condition;

when there is no vertex meeting the query condition in the vertices having the connection relationship with the start vertex, determine, through the second processing model, the vertex having the connection relationship with the start vertex as the intermediate vertex; and determine, through the second processing model, the third processing model configured to process the data of the intermediate vertex.

In an optional design, the apparatus stores data slices of a plurality of vertices in the graph database, and a correspondence between each of the data slices and the processing model in the apparatus is established through a local consistence hash ring. The determining module 1003 is configured to:

determine a first location on the local consistence hash ring according to the identifier of the start vertex through the first processing model; and determine the second processing model corresponding to the data query request according to the first location and a location of each processing model in the apparatus on the local consistence hash ring through the first processing model.

In an optional design, the transmitting module 1002 is configured to:

transmit the data query request to a message queue of the second processing model through the first processing model, where the message queue of the second processing model is configured to store a task for processing of the second processing model.

In an optional design, the third processing model belongs to the apparatus. The transmitting module 1002 is configured to:

transmit the data query request to the third processing model through the second processing model.

In an optional design, the third processing model belongs to a third node device. The transmitting module 1002 is configured to:

transmit the data query request to a fourth processing model in the third node device through the second processing model, where the fourth processing model is a processing model configured to schedule the data query request in the third node device; and the third node device is configured to transmit the data query request to the third processing model through the fourth processing model.

In an optional design, the transmitting module 1002 is configured to:

transmit the data query request to the fourth processing model based on a remote procedure call through the second processing model.

In an optional design, when the third processing model determines a processing result of the data query request, a node device in which the third processing model is located is configured to transmit, through the third processing model, the processing result of the data query request to a processing model configured to schedule the data query request in the node device in which the third processing model is located.

The node device in which the third processing model is located is further configured to transmit the processing result of the data query request to the second node device through the processing model configured to schedule the data query request in the node device in which the third processing model is located.

In an optional design, the third processing model determines a processing result of the data query request.

When the third processing model belongs to the first node device, the first node device is configured to transmit the processing result of the data query request to the first processing model through the third processing model, the first processing model being a processing model configured to schedule the data query request in the first node device, and the first node device is further configured to transmit the processing result of the data query request to the second node device through the first processing model; and when the third processing model belongs to a third node device, the third node device is configured to transmit the processing result of the data query request to a fourth processing model through the third processing model, the fourth processing model being a processing model configured to schedule the data query request in the third node device, and the third node device is further configured to transmit the processing result of the data query request to the second node device through the fourth processing model.

In an optional design, a plurality of processing models transmits processing results of the data query request to the second node device; and the second node device is configured to summarize the processing results of the data query request transmitted by the at least two processing models.

In an optional design, a plurality of threads of each processor core of the apparatus are bound to a plurality of processing models in the apparatus one by one.

In an optional design, the first processing model, the second processing model, and the third processing model are actor models.

An embodiment of the present disclosure further provides a computer device, including: a processor and a memory, the memory storing at least one program, the at least one program being loaded and executed by the processor to implement the data query request processing method according to the foregoing method embodiments.

Figure 11:
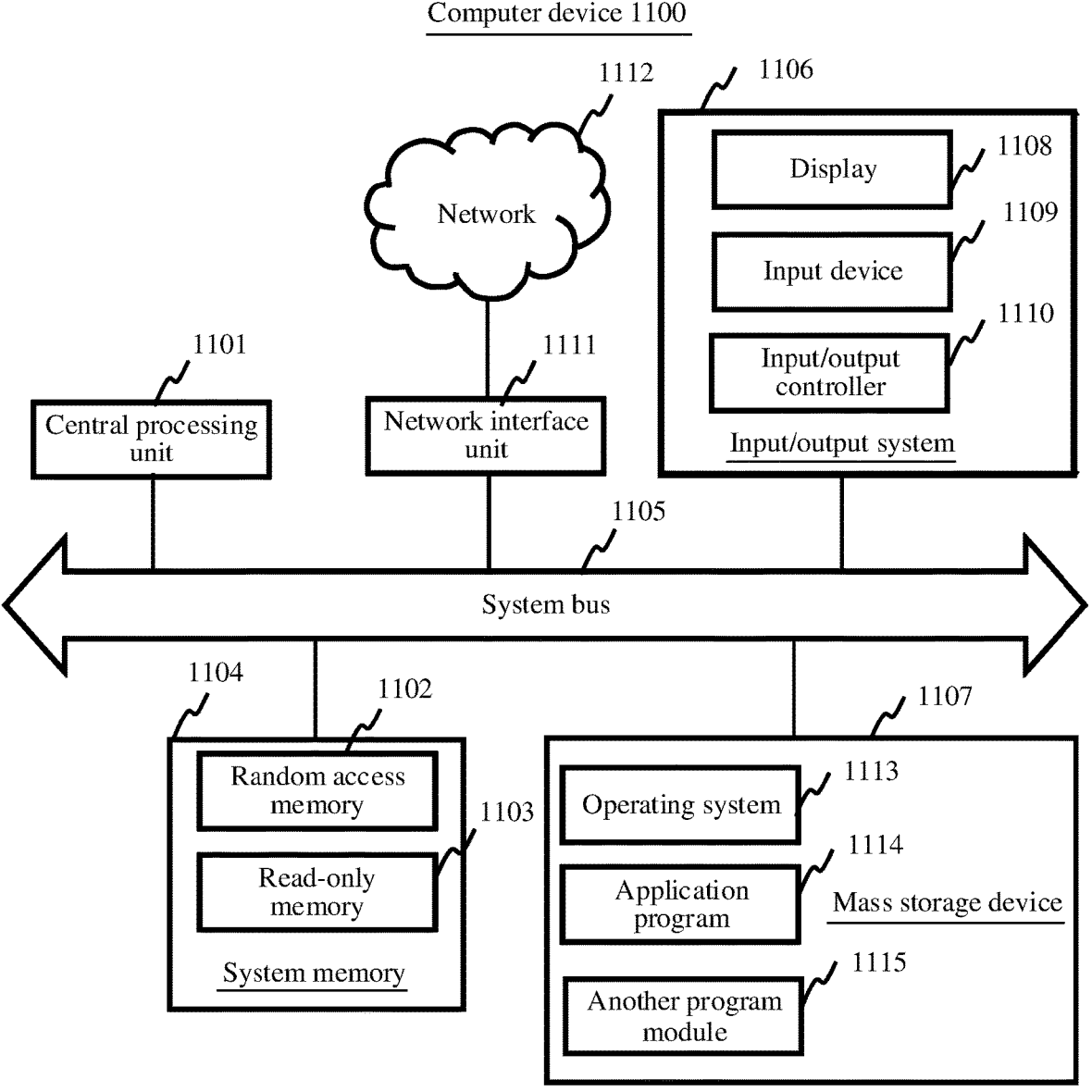
FIG. 11 is a schematic structural diagram of a computer device according to an exemplary embodiment of the present disclosure.

Optionally, the computer device is a server. For example, FIG. 11 is a schematic structural diagram of a computer device according to an exemplary embodiment of the present disclosure.

The computer device 1100 includes a central processing unit (CPU) 1101, a system memory 1104 including a random access memory (RAM) 1102 and a read-only memory (ROM) 1103, and a system bus 1105 connecting the system memory 1104 to the CPU 1101. The computer device 1100 further includes a basic input/output (I/O) system 1106 assisting in transmitting information between components in the computer device, and a mass storage device 1107 configured to store an operating system 1113, an application program 1114, and another program module 1115.

The basic I/O system 1106 includes a display 1108 configured to display information and an input device 1109 such as a mouse or a keyboard that is configured to input information by a user. The display 1108 and the input device 1109 are both connected to the central processing unit 1101 through an input/output controller 1110 connected to the system bus 1105. The basic I/O system 1106 may further include the I/O controller 1110 for receiving and processing input from a plurality of other devices such as a keyboard, a mouse, and an electronic stylus. Similarly, the input/output controller 1110 further provides output to a display screen, a printer, or other types of output devices.

The mass storage device 1107 is connected to the central processing unit 1101 through a mass storage controller (not shown) connected to the system bus 1105. The mass storage device 1107 and an associated computer-readable storage medium thereof provide non-volatile storage for the computer device 1100. That is, the mass storage device 1107 may include a computer-readable medium (not shown) such as a hard disk or a compact disc ROM (CD-ROM) drive.

Without loss of generality, the computer-readable storage medium may include a computer storage medium and a communication medium. The computer storage medium includes volatile and non-volatile, removable and non-removable media that store information such as computer-readable storage instructions, data structures, program modules, or other data and that are implemented by using any method or technology. The computer storage medium includes a RAM, a ROM, an erasable programmable read-only register (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, it may be known by a person skilled in the art that the computer storage medium is not limited to the foregoing several types. The system memory 1104 and the mass storage device 1107 may be collectively referred to as a memory.

The memory stores one or more programs, and the one or more programs are configured to be executed by one or more CPUs 1101. The one or more programs comprise instructions used for implementing the foregoing method embodiments, and the CPU 1101 executes the one or more programs to implement the method provided in the foregoing method embodiments.

According to the various embodiments of the present disclosure, the computer device 1100 may further be connected, through a network such as the Internet, to a remote computer device on the network for running. That is, the computer device 1100 may be connected to a network 1112 by a network interface unit 1111 connected to the system bus 1105, or may be connected to another type of network or remote computer device system (not shown) by a network interface unit 1111.

The memory further includes one or more programs. The one or more programs are stored in the memory and comprise steps to be executed by the computer device in the method provided in the embodiments of the present disclosure.

The technical solutions provided in the present disclosure have at least the following beneficial effects: after receiving a data query request, a node device can directly process the data query request through a processing model in the node device, determine a processing model configured to process data of a vertex related to the data query request in a graph database, and determine a processing result of the data query request. In a process of processing the data query request, the data query request is directly processed through the processing model without creating a thread, which can avoid creating a corresponding thread when the data query request is processed, thereby accelerating data query.

The term module (and other similar terms such as sub-module, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

An embodiment of the present disclosure further provides a non-transitory computer-readable storage medium, storing at least one program, when being loaded and executed by one or more processors of an electronic device (e.g., a computer device), the at least one program implementing the data query request processing method provided in the foregoing method embodiments.

The present disclosure further provides a computer program product or a computer program, including computer instructions stored in a computer-readable storage medium. A processor of a computer device reads the computer instructions from the computer-readable storage medium, and executes the computer instructions, to cause the computer device to perform the data query request processing method provided in the foregoing method embodiments.

What is claimed is:

1. A data query request processing method, applied to a first node device, the first node device being one of at least two node devices in a distributed data storage system based on a graph database, the method comprising:

receiving, by the first node device through a first actor model in the first node device, a data query request transmitted by a second node device, the data query request being configured for querying data related to a first vertex in the graph database, the data query request carrying an identifier of a start vertex, and the first node device storing data of the start vertex;

transmitting, by the first node device, the data query request to a second actor model in the first node device through the first actor model, the second actor model being an actor model configured to process the data of the start vertex in the first node device;

determining, by the first node device, a third actor model based on the data query request through the second actor model, the third actor model being configured to process data of the first vertex or an intermediate vertex, and the intermediate vertex being a vertex between the start vertex and the first vertex; and transmitting, by the first node device, the data query request to the third actor model through the second actor model, wherein two threads of a processor core of the first node device are bound, one-to-one, to the first actor model and the second actor model, and the first actor model, the second actor model, and the third actor model operate concurrently.

2. The method according to claim 1, wherein determining, by the first node device, the third actor model comprises:

determining, by the first node device, the third actor model according to a storage structure of the start vertex in the graph database and a query condition in the data query request through the second actor model.

3. The method according to claim 2, wherein the storage structure of the start vertex in the graph database comprises an attribute of the start vertex, an identifier of a vertex having a connection relationship with the start vertex, and an attribute of the connection relationship; and determining, by the first node device, the third actor model according to the storage structure of the start vertex in the graph database and the query condition in the data query request through the second actor model comprises:

querying a vertex that meets the query condition from vertices having the connection relationship with the start vertex, by the first node device through the second actor model according to one or more of the attribute of the start vertex, the vertices having the connection relationship with the start vertex, and the attribute of the connection relationship;

in response to a vertex in the vertices having the connection relationship with the start vertex meeting the query condition, determining, by the first node device through the second actor model, the vertex meeting the query condition as the first vertex; and determining, by the first node device through the second actor model, the third actor model configured to process the data of the first vertex.

4. The method according to claim 2, wherein the storage structure of the start vertex in the graph database comprises an attribute of the start vertex, an identifier of a vertex having a connection relationship with the start vertex, and an attribute of the connection relationship; and determining, by the first node device, the third actor model according to the storage structure of the start vertex in the graph database and the query condition in the data query request through the second actor model comprises:

querying a vertex that meets the query condition from vertices having the connection relationship with the start vertex, by the first node device through the second actor model according to one or more of the attribute of the start vertex, the vertices having the connection relationship with the start vertex, and the attribute of the connection relationship;

in response to no vertex meeting the query condition in the vertices having the connection relationship with the start vertex, determining, by the first node device through the second actor model, the vertex having the connection relationship with the start vertex as the intermediate vertex; and determining, by the first node device through the second actor model, the third actor model configured to process the data of the intermediate vertex.

5. The method according to claim 1, wherein the first node device stores data slices of at least two vertices in the graph database, and a correspondence between a data slice and a corresponding actor model in the first node device is established through a local consistence hash ring; and the method further comprises:

determining, by the first node device, a first location on the local consistence hash ring according to the identifier of the start vertex through the first actor model; and determining, by the first node device, the second actor model corresponding to the data query request according to the first location and a location of any actor model in the first node device on the local consistence hash ring through the first actor model.

6. The method according to claim 1, wherein transmitting, by the first node device, the data query request to the second actor model in the first node device through the first actor model comprises:

transmitting, by the first node device, the data query request to a message queue of the second actor model through the first actor model, wherein the message queue of the second actor model is configured to store a task for processing of the second actor model.

7. The method according to claim 1, wherein the third actor model belongs to the first node device; and transmitting, by the first node device, the data query request to the third actor model through the second actor model comprises:

transmitting, by the first node device, the data query request to the third actor model in the first node device through the second actor model.

8. The method according to claim 1, wherein the third actor model belongs to a third node device; and the transmitting, by the first node device, the data query request to the third actor model through the second actor model comprises:

transmitting, by the first node device, the data query request to a fourth actor model in the third node device through the second actor model, wherein the fourth actor model is an actor model configured to schedule the data query request in the third node device; and the third node device is configured to transmit the data query request to the third actor model through the fourth actor model.

9. The method according to claim 8, wherein transmitting, by the first node device, the data query request to the fourth actor model in the third node device through the second actor model comprises:

transmitting, by the first node device, the data query request to the fourth actor model based on a remote procedure call through the second actor model.

10. The method according to claim 1, wherein the third actor model determines a processing result of the data query request;

in response to the third actor model belonging to the first node device, the first node device is configured to transmit the processing result of the data query request to the first actor model through the third actor model, the first actor model being an actor model configured to schedule the data query request in the first node device, and the first node device is further configured to transmit the processing result of the data query request to the second node device through the first actor model; and in response to the third actor model belonging to a third node device, the third node device is configured to transmit the processing result of the data query request to a fourth actor model through the third actor model, the fourth actor model being an actor model configured to schedule the data query request in the third node device, and the third node device is further configured to transmit the processing result of the data query request to the second node device through the fourth actor model.

11. The method according to claim 10, wherein at least two actor models transmit processing results of the data query request to the second node device; and the second node device is configured to summarize the processing results of the data query request transmitted by the at least two actor models.

12. An electronic device, configured as a first node device, the first node device being one of at least two node devices in a distributed data storage system based on a graph database, the device comprising:

one or more processors, and a memory storing computer programs that, when being executed, cause the one or more processors to perform:

receiving, through a first actor model, a data query request transmitted by a second node device, the data query request being configured for querying data related to a first vertex in the graph database, the data query request carrying an identifier of a start vertex, and the first node device storing data of the start vertex;

transmitting the data query request to a second actor model in the first node device through the first actor model, the second actor model being an actor model configured to process the data of the start vertex in the first node device;

determining a third actor model based on the data query request through the second actor model, the third actor model being configured to process data of the first vertex or an intermediate vertex, and the intermediate vertex being a vertex between the start vertex and the first vertex; and transmitting the data query request to the third actor model through the second actor model, wherein two threads of a processor core of the first node device are bound, one-to-one, to the first actor model and the second actor model, and the first actor model, the second actor model, and the third actor model operate concurrently.

13. The device according to claim 12, wherein the first node device is further configured to perform:

determining the third actor model according to a storage structure of the start vertex in the graph database and a query condition in the data query request through the second actor model.

14. The device according to claim 13, wherein the storage structure of the start vertex in the graph database comprises an attribute of the start vertex, an identifier of a vertex having a connection relationship with the start vertex, and an attribute of the connection relationship; and the first node device is further configured to perform:

querying a vertex that meets the query condition from vertices having the connection relationship with the start vertex, through the second actor model according to one or more of the attribute of the start vertex, the vertices having the connection relationship with the start vertex, and the attribute of the connection relationship;

in response to a vertex in the vertices having the connection relationship with the start vertex meeting the query condition, determining, through the second actor model, the vertex meeting the query condition as the first vertex; and determining, through the second actor model, the third actor model configured to process the data of the first vertex.

15. The device according to claim 13, wherein the storage structure of the start vertex in the graph database comprises an attribute of the start vertex, an identifier of a vertex having a connection relationship with the start vertex, and an attribute of the connection relationship; and the first node device is further configured to perform:

querying a vertex that meets the query condition from vertices having the connection relationship with the start vertex, through the second actor model according to one or more of the attribute of the start vertex, the vertices having the connection relationship with the start vertex, and the attribute of the connection relationship;

in response to no vertex meeting the query condition in the vertices having the connection relationship with the start vertex, determining, through the second actor model, the vertex having the connection relationship with the start vertex as the intermediate vertex; and determining, through the second actor model, the third actor model configured to process the data of the intermediate vertex.

16. The device according to claim 12, wherein the first node device stores data slices of at least two vertices in the graph database, and a correspondence between a data slice and a corresponding actor model in the first node device is established through a local consistence hash ring; and the first node device is further configured to perform:

determining a first location on the local consistence hash ring according to the identifier of the start vertex through the first actor model; and determining the second actor model corresponding to the data query request according to the first location and a location of any actor model in the first node device on the local consistence hash ring through the first actor model.

17. The device according to claim 12, wherein the first node device is further configured to perform:

transmitting the data query request to a message queue of the second actor model through the first actor model, wherein the message queue of the second actor model is configured to store a task for processing of the second actor model.

18. A non-transitory computer-readable storage medium, storing at least one program that, when being executed, causes one or more processors of a first node device to implement a data query request processing method, the first node device being one of at least two node devices in a distributed data storage system based on a graph database, the method comprising:

receiving, by the first node device through a first actor model in the first node device, a data query request transmitted by a second node device, the data query request being configured for querying data related to a first vertex in the graph database, the data query request carrying an identifier of a start vertex, and the first node device storing data of the start vertex;

transmitting, by the first node device, the data query request to a second actor model in the first node device through the first actor model, the second actor model being an actor model configured to process the data of the start vertex in the first node device;

determining, by the first node device, a third actor model based on the data query request through the second actor model, the third actor model being configured to process data of the first vertex or an intermediate vertex, and the intermediate vertex being a vertex between the start vertex and the first vertex; and transmitting, by the first node device, the data query request to the third actor model through the second actor model, wherein two threads of a processor core of the first node device are bound, one-to-one, to the first actor model and the second actor model, and the first actor model, the second actor model, and the third actor model operate concurrently.

\* \* \* \* \*